Patented Apr. 26, 1938

2,115,039

UNITED STATES PATENT OFFICE 2,115,039

LITHOPONE AND PROCESS OF MAKING SAME

Kenneth S. Mowlds, Baltimore, Md., assignor to The Glidden Company, Cleveland, Ohio, a corporation of Ohio No Drawing. Application August 14, 1934, Serial No. 739,812

10 Claims. (Cl. 134—78)

This invention relates to lithopone, and has particular reference to a new method of precipitating lithopone, whereby a lithopone is produced which has unusual properties, both in the plant as slurry, and in the dry state, when admixed with paint. More particularly, my new method of precipitation produces a more uniformly fine pigment, one which filters at a much more rapid rate than ordinary lithopone, and one which, in the dry state, is softer, easier to disperse and gives a flatter effect with ordinary paint vehicles.

In the ordinary method of producing lithopone, barium sulfide and zinc sulfate solutions are run together, or one is run into the other, under more or less carefully controlled conditions as to pH etc. The struck pigment is settled, filtered, and washed. This green cake is then calcined in a muffle, or otherwise; the calcined material is quenched in water, wet ground, filtered, washed, dried, and dry ground—or pulverized.

I have discovered that an unusually soft, uniformly fine lithopone can be prepared by conducting the precipitation while holding a definite excess concentration of barium sulfide at all times. This concentration may vary between 1 and 15 grams barium sulfide per liter, but optimum results are obtained with a concentration of from 2.0 to 6 grams per liter.

The excess concentration can be determined in any desired manner. I have found that a very convenient apparatus is a Leeds and Northrup conductivity apparatus, in which the resistance of the solution is measured and recorded on a Wheatstone bridge arrangement. The instrument is standardized on each batch of zinc sulfate and barium sulfide solution, by determining conductivities against actual chemical analyses of the solution.

The struck pulp is adjusted to a desired end point, such as the customary one of 0.2 gram barium sulfide per liter. It is then filtered; and the pulp prepared by my method gives a rate of filtration which is 100-200% faster than a normal pulp. The washed pigment is calcined, and quenched. The calcined pigment is so uniformly fine, and of such soft texture, that the wet grinding circuit can be eliminated; the pigment can be filtered, dry ground and packed direct.

Not only is the manufacturing process simplified by this method for precipitation control, but the pigment gives radically different results from the ordinary lithopone. It is characterized by its soft texture, requiring little or no grinding after calcination. The bulking value is increased, it mixes rapidly in oils, and settles very little after being ground. The pigment has a larger number of fine particles than lithopone heretofore produced.

As an example of my invention, I prepared 2500 gallons of a zinc sulfate solution with a concentration of 125 grams zinc per liter, and 5000 gallons of a 17° Baumé barium sulfide solution, containing 200 grams BaS per liter. Both solutions were standardized, by analysis, against a standard Leeds and Northrup conductivity apparatus. Barium sulfide solution was run into 1500 gallons of water, (or it may be run into the residual pulp from the last batch in ordinary practice) until the BaS concentration reached 6 grams per liter. The zinc sulfate was then started into the tank, the valves in the lines from the solution tanks being adjusted to hold the BaS concentration at 2½ to 6 grams per liter; agitation was continuous. When the solutions were all added, the BaS content was adjusted to 0.2 gram per liter by the addition of $ZnSO_4$ solution. The lithopone was settled; the slurry filtered, with great ease and rapidity, and the green cake washed nicely. The cake was calcined, by heating in a muffle for 2 hours until a temperature of 740° C. was attained; the calcined pigment was then quenched in water, filtered, dried and ground through a Raymond mill. The resultant pigment was characterized by extreme softness, uniformly fine particle size, ease of dispersion, and unusual flattening properties on paint vehicles.

Agitation is a very important detail in the successful use of my process, as the solution must be uniform throughout at all times, in order to get satisfactory conductivity measurements. A turbo-agitator is preferred for this purpose, although any rapid and efficient agitator will be satisfactory.

In the use of my process, it is of course possible to vary the concentrations of the barium sulfide and zinc sulphate solutions, but for most operations the concentrations should be held between 90 and 150 grams per liter of Zn, and 125 and 200 grams per liter of barium sulfide.

The finished pulp is preferably run to a concentration of 0.2 gram BaS per liter, to prevent loss of barium sulfide; it is kept on the barium side to prevent the presence of soluble zinc sulfate and to produce a whiter color.

While is is not necessary to wet grind my pigment for most purposes, I can of course put the pigment through the cycle; and where compounded lithopones are to be made, I prefer to do so, merely to insure more even distribution of the compounding agent.

I claim:

1. The method of precipitating lithopone which comprises intermixing a zinc sulfate solution and a barium sulfide solution, controlling the rate of admixture so that there is present during precipitation an excess concentration of 1–15 grams barium sulfide per liter of solution.

2. The method of precipitating lithopone which comprises intermixing a zinc sulfate solution and a barium sulfide solution, controlling the rate of admixture so that there is present during precipitation an excess concentration of 2.0–6 grams barium sulfide per liter of solution.

3. The method of precipitating lithopone which comprises intermixing a zinc sulfate solution and a barium sulfide solution, controlling the rate of admixture so that there is present during precipitation an excess concentration of 1–15 grams barium sulfide per liter of solution, and reducing the concentration of barium sulfide to below 1 gram per liter at the end of the precipitation.

4. The method of precipitating lithopone which comprises intermixing a zinc sulfate solution and a barium sulfide solution, controlling the rate of admixture so that there is present during precipitation an excess concentration of 2.5–6 grams barium sulfide per liter of solution, and reducing the concentration of barium sulfide to below 1 gram per liter at the end of the precipitation.

5. The method of precipitating lithopone which comprises intermixing a zinc sulfate solution and a barium sulfide solution, controlling the rate of admixture so that there is present during precipitation an excess concentration of 2.0–6 grams barium sulfide per liter of solution, and reducing the concentration of barium sulfide to 0.2 grams per liter at the end of the precipitation.

6. The method of precipitating lithopone which comprises simultaneously feeding zinc sulfate solutions and barium sulfide solutions into a precipitating tank, controlling the rates of feed so that there is present during precipitation an excess concentration of 1–15 grams barium sulfide per liter of solution.

7. The method of precipitating lithopone which comprises simultaneously feeding zinc sulfate solutions and barium sulfide solutions into a precipitating tank, controlling the rates of feed so that there is present during precipitation an excess concentration of 2.0–6 grams barium sulfide per liter of solution.

8. The method of precipitating lithopone which comprises simultaneously feeding zinc sulfate solutions and barium sulfide solutions into a precipitating tank, controlling the rates of feed so that there is present during precipitation an excess concentration of 1–15 grams barium sulfide per liter of solution, and reducing the concentration of barium sulfide to below 1 gram per liter at the end of the precipitation.

9. The method of precipitating lithopone which comprises simultaneously feeding zinc sulfate solutions and barium sulfide solutions into a precipitating tank, controlling the rates of feed so that there is present during precipitation an excess concentration of 2.0–6 grams barium sulfide per liter of solution, and reducing the concentration of barium sulfide to below 1 gram per liter at the end of the precipitation.

10. The method of precipitating lithopone which comprises simultaneously feeding zinc sulfate solutions and barium sulfide solutions into a precipitating tank, controlling the rates of feed so that there is present during precipitation an excess concentration of 2.0–6 grams barium sulfide per liter of solution, and reducing the concentration of barium sulfide to 0.2 gram per liter at the end of the precipitation.

KENNETH S. MOWLDS.